United States Patent Office 3,163,649
Patented Dec. 29, 1964

3,163,649
SUBSTITUTED PHENYL-PIPERAZINE COMPOUNDS
Henri Morren, Forest-Brussels, Belgium, assignor to UCB (Union Chimique-Chemische Bedrijven), S.A., Brussels, Belgium, a corporation of Belgium
No Drawing. Filed Mar. 9, 1962, Ser. No. 178,549
Claims priority, application Belgium, Mar. 16, 1961, 478,601, Patent 601,394; Feb. 21, 1962, 489,964
15 Claims. (Cl. 260—268)

Belgian Patent 569,407 relates to piperazine derivatives among which is a substance of the formula

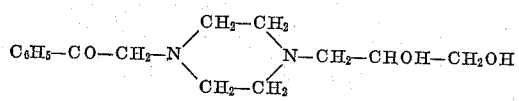

This product has an interesting anti-tussive activity and a very low toxicity. However, it has the disadvantage that it cannot be formulated in all the desired pharmaceutical dosage unit forms.

The present invention relates to new piperazine derivatives of the general formula

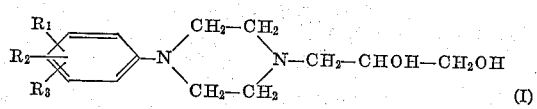

wherein $R_1$ is selected from the group consisting of a hydrogen atom, a chlorine atom, alkyl and alkoxy radicals and $R_2$ and $R_3$ are selected from the group consisting of a hydrogen atom, alkyl and alkoxy radicals.

The present invention relates also to the preparation of these compounds and of their addition salts of mineral and organic acids.

According to the invention, the compounds conforming to the Formula I are prepared by reacting a 1-($R_1$,$R_2$,$R_3$-phenyl)-piperazine with 2,3 - epoxy - 1 - propanol, $R_1$, $R_2$ and $R_3$ having the same significance as above.

The addition salts of organic or mineral acids are prepared according to known methods.

The products of the invention possess a powerful anti-tussive activity; they are of very low toxicity and have the advantage that they cause no toxicomania.

In Table I, the anti-tussive activity of the products prepared according to Examples 1 and 2 is compared with that of a reference product, i.e. codeine phosphate, described as product A. The reduction of the intensity of cough has been determined by the method of R. Domenjoz (Arch. exp. Path. u. Pharmakodyn. 215 (1952),1924). According to this method, the cough-reflex is observed in a cat anaesthetized with Numal and of which the superior laryngeal nerve is submitted to an electric stimulation.

TABLE I

| Products | Dose (orally in mg./kg.) | Reduction of the intensity of cough, percent |
|---|---|---|
| Example 1 | 6 | 48 |
| Example 2 | 6 | 33 |
| A | 6 | 38 |

In Table II, the toxicity of the product prepared in Example 1 is compared with that of codeine phosphate. The figures correspond to the toxicity L.D. 50, i.e. the milligrams of product per kilogram of animal which administered to rats orally (O.R.) or intravenously (I.R.), kill 50% of the animals tested.

TABLE II

| Products | Toxicity | |
|---|---|---|
| | O. R. | I. R. |
| Example 1 | 750 | 200 |
| A | 85 | 54 |

In order to more fully and clearly elucidate the present invention the following specific examples are presented. It is intended that these examples be considered as illustrative rather than limiting.

Example 1.—Preparation of 1-Phenyl-4-(2,3-Dihydroxypropyl)-Piperazine

To a solution of 64.8 g. of 1-phenylpiperazine in 80 ml. ethanol, there is added a solution of 34 g. of 2,3-epoxy-1-propanol in 50 ml. water while maintaining the temperature below 50° C. The solution is allowed to stand overnight, then it is evaporated to dryness in vacuo and the syrupy residue is crystallized from 100 ml. acetone.

There is obtained 60 g. of 1-phenyl-4-(2,3-dihydroxypropyl)-piperazine melting at 105° C. and boiling at 205° C./1 mm. Hg.

The corresponding monohydrochloride, prepared in the presence of alcohol has a melting point of 142° C.

Example 2.—Preparation of 1-(4-Chlorophenyl)-4-(2,3-Dihydroxypropyl)-Piperazine

This product is prepared according to the method described in Example 1, using 1-(4-chlorophenyl)-piperazine instead of 1-phenylpiperazine. There is obtained 1-(4 - chlorophenyl) - 4 - (2,3-dihydroxypropyl)-piperazine which, crystallized from isopropanol, melts at 142° C.

Example 3.—Preparation of 1-(2-Chlorophenyl)-4-(2,3-Dihydroxypropyl)-Piperazine

This product is prepared according to the method described in Example 1, using 1-(2-chlorophenyl)-piperazine instead of 1-phenyl-piperazine. There is obtained the 1-(2-chlorophenyl) - 4 - (2,3-dihydroxypropyl)-piperazine which boils at 180° C./0.02 mm. Hg.

Example 4.—Preparation of 1-(2-Methoxyphenyl)-4-(2,3-Dihydroxypropyl)-Piperazine To 38.4 g. of 1-(2-methoxyphenyl)-piperazine heated to about 70° C., there is added slowly and with stirring, 22 g. of 2,3-epoxy-1-propanol. The temperature of the reaction mixture rises spontaneously to 140° C. It is cooled in order to maintain the temperature at about 100–110° C., then it is allowed to stand for one hour.

After distillation under high vacuum, there is obtained 43 g. of (1-(2-methoxyphenyl)-4-(2,3-dihydroxypropyl)-piperazine. Boiling point: 185° C./0.01 mm. Hg.

The base is dissolved in 200 ml. ethanol and hydrochloric acid in alcoholic solution is added thereto until distinctly acid reaction.

The corresponding dihydrochloride crystallizes. Melting point: 225° C.

Example 5

According to the method described in Example 1, the following compounds are prepared:

1 - (2 - methylphenyl)-4-(2,3-dihydroxypropyl)-piperazine. Boiling point of the base: 185° C./0.05 mm. Hg. Melting point of the monohydrochloride (recrystallized from isopropanol): 187° C.

1 - (3 - methylphenyl)-4-(2,3-dihydroxypropyl)-piperazine. Boiling point of the base: 225° C./2.5 mm. Hg. Melting point of the dihydrochloride (recrystallized from methanol): 227° C.

1 - (4 - methylphenyl)-4-(2,3-dihydroxypropyl)-piperazine. Boiling point of the base: 195° C./0.05 mm. Hg. This compound, crystallized from a mixture of benzene and hexane, melts at 100° C.

1 - (4 - tert.butylphenyl)4-4(2,3-dihydroxypropyl)-piperazine. Melting point of the base (recrystallized from a mixture of benzene and acetone without previous distillation): 132° C.

1 - (2,3 - dimethylphenyl)-4-(2,3-dihydroxypropyl)-piperazine. Boiling point of the base: 200° C./0.3 mm. Hg. Melting point of the monohydrochloride (crystallized from a mixture of ethanol and ether): 190° C.

1 - (2,4 - dimethylphenyl)-4-(2,3-dihydroxypropyl)-piperazine. Boiling point of the base: 172–175° C./0.03 mm. H. Melting point of the monohydrochloride (crystallized from ethanol): 185° C.

1 - (2,5 - dimethylphenyl)-4-(2,3-dihydroxypropyl)-piperazine. Boiling point of the base: 185° C./0.1 mm. Hg. Melting point of the monohydrochloride (crystallized from methanol): 195° C.

1 - (2,6 - dimethylphenyl)-4-(2,3-dihydroxypropyl)-piperazine. Boiling point of the base: 177–180° C./0.05 mm. Hg. Melting point of the monohydrochloridic (recrystallized from ethanol): 175° C.

1 - (2,5 - dimethoxyphenyl)-4-(2,3-dihydroxypropyl)-piperazine. Boiling point of the base 208–210° C./0.1 mm. Hg. Melting point of the monohydrochloride( crystallized from ethanol): 164° C.

To prepare these compounds, there have been used as starting products especially one of the following new products:

1-(4-tert.butylphenyl)-piperazine (boiling point: 180–185° C./14 mm. Hg).

1 - (2,3 - dimethylphenyl)-piperazine (boiling point: 160–165° C./12 mm. Hg).

1 - (2,4-dimethylphenyl)-piperazine (boiling point: 152–155° C./11 mm. Hg).

1 - (2,6 - dimethylphenyl)-piperazine (boiling point: 145–150° C./12 mm. Hg).

These products may be prepared according to known methods, for instance

By heating an equimolecular mixture of diethanolamine hydrochloride and a hydrochloride of an appropriate derivative of aniline (C. B. Pollard and T. H. Wicker, J. Am. Chem. Soc. 76 (1954), 1853–55).

By heating an equimolecular mixture of a hydrohalide of a 2,2'-dihalogenodiethylamine and of an appropriate derivative of aniline, in the presence of an aliphatic alcohol and sodium carbonate (V. Prelog and Z. Blazek, Coll. Czechoslovak chem. Commun. 6 (1934), 211–24).

I claim:

1. A compound of the formula

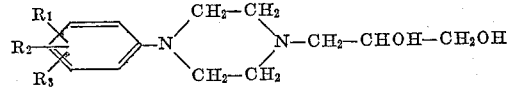

wherein $R_1$ is selected from the group consisting of H, Cl, lower alkyl and lower alkoxy, and $R_2$ and $R_3$ are independently selected from the group consisting of H, lower alkyl and lower alkoxy.

2. Acid addition salt of a compound as claimed in claim 1.

3. 1-phenyl-4-(2,3-dihydroxypropyl)-piperazine.

4. 1 - (2 - chlorophenyl)-4-(2,3-dihydroxypropyl)-piperazine.

5. 1 - (4-chlorophenyl)-4-(2,3-dihydroxypropyl)-piperazine.

6. 1 - (2-methoxyphenyl)-4-(2,3-dihydroxypropyl)-piperazine.

7. 1 - (2-methylphenyl)-4-(2,3-dihydroxypropyl)-piperazine.

8. 1 - (3 - methylphenyl)-4-(2,3-dihydroxypropyl)-piperazine.

9. 1 - (4-methylphenyl)-4-(2,3-dihydroxypropyl)-piperazine.

10. 1 - (4 - tert.butylphenyl)-4-(2,3-dihydroxypropyl)-piperazine.

11. 1 - (2,3-dimethylphenyl)-4-(2,3-dihydroxypropyl)-piperazine.

12. 1 - (2,4-dimethylphenyl)-4-(2,3-dihydroxypropyl)-piperazine.

13. 1 - (2,5-dimethylphenyl)-4-(2,3-dihydroxypropyl)-piperazine.

14. 1 - (2,6-dimethylphenyl)-4-(2,3-dihydroxypropyl)-piperazine.

15. 1 - (2,5 - dimethoxyphnyl)-4-(2,3-dihydroxypropyl)-piperazine.

References Cited in the file of this patent

UNITED STATES PATENTS

| | | |
|---|---|---|
| 2,575,122 | Pollard et al. | Nov. 13, 1951 |
| 2,946,793 | Michaels et al. | July 26, 1960 |
| 2,954,380 | Shapiro et al | Sept. 27, 1960 |
| 3,037,981 | Hayao | June 5, 1962 |

FOREIGN PATENTS

| | | |
|---|---|---|
| 2,575,122 | Germany | Nov. 13, 1951 |
| 850,662 | Great Britain | Oct. 5, 1960 |

OTHER REFERENCES

Bizard et al.: Scciete de Biologie, Comptes Rendus, vol. 145, pages 1303–5 (1951).

McKay et al.: Journal American Chemical Society, vol. 74, pages 2978–81 (1952).

Chemical Abstracts, vol 49, page 10,312c (1955), abstracting Zhur. Obschei Khim., vol. 24, pages 1444–9 (1954).